United States Patent
Nasreddine et al.

(12) 
(10) Patent No.: US 10,899,857 B2
(45) Date of Patent: Jan. 26, 2021

(54) POLYCHLOROPRENE COMPOSITIONS

(71) Applicant: ARLANXEO DEUTSCHLAND GMBH, Dormagen (DE)

(72) Inventors: Victor Nasreddine, Cologne (DE); Heiner Stange, Leverkusen (DE); Nicolas Sary, Dormagen (DE); Martin Schneider, Cologne (DE); Kay Varnhorn, Monheim (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 191 days.

(21) Appl. No.: 16/064,209

(22) PCT Filed: Nov. 25, 2016

(86) PCT No.: PCT/EP2016/078804
§ 371 (c)(1),
(2) Date: Jun. 20, 2018

(87) PCT Pub. No.: WO2017/108329
PCT Pub. Date: Jun. 29, 2017

(65) Prior Publication Data
US 2019/0023821 A1    Jan. 24, 2019

(30) Foreign Application Priority Data

Dec. 23, 2015 (EP) .................... 15202517

(51) Int. Cl.
| | | |
|---|---|---|
| *C08F 136/18* | (2006.01) | |
| *C08C 19/26* | (2006.01) | |
| *C08K 3/011* | (2018.01) | |
| *C08K 5/3492* | (2006.01) | |
| *C08K 3/22* | (2006.01) | |
| *C08K 5/47* | (2006.01) | |
| *C08K 5/098* | (2006.01) | |
| *C08K 5/17* | (2006.01) | |
| *C08K 5/00* | (2006.01) | |

(52) U.S. Cl.
CPC ............ *C08F 136/18* (2013.01); *C08C 19/26* (2013.01); *C08K 3/011* (2018.01); *C08K 3/22* (2013.01); *C08K 5/0025* (2013.01); *C08K 5/098* (2013.01); *C08K 5/17* (2013.01); *C08K 5/3492* (2013.01); *C08K 5/47* (2013.01); *C08F 2810/20* (2013.01); *C08K 2003/2217* (2013.01); *C08K 2003/2296* (2013.01)

(58) Field of Classification Search
CPC ..... C08F 136/18; C08F 2810/20; C08C 19/26
See application file for complete search history.

(56) References Cited

U.S. PATENT DOCUMENTS

| | | | |
|---|---|---|---|
| 2,187,146 A | 10/1936 | Calcott et al. | |
| 2,567,117 A | 9/1951 | Mochei | |
| 3,310,546 A * | 3/1967 | Becker ................... | C08K 5/098 525/364 |
| 3,310,564 A | 3/1967 | Kasai | |
| 7,932,318 B2 | 4/2011 | Hattori et al. | |
| 9,410,027 B2 | 4/2016 | Säwe et al. | |
| 9,475,895 B2 | 10/2016 | Sunada et al. | |
| 9,938,363 B2 | 4/2018 | Neuner et al. | |
| 2011/0092358 A1 | 4/2011 | Säwe et al. | |
| 2014/0128538 A1* | 5/2014 | Yarzabel .............. | C08K 5/0025 524/567 |
| 2014/0142268 A1 | 5/2014 | Neuner et al. | |
| 2015/0203613 A1 | 7/2015 | Sunada et al. | |

FOREIGN PATENT DOCUMENTS

| | | |
|---|---|---|
| CA | 2 83 318 A1 | 10/2012 |
| JP | S 57-63304 A | 4/1982 |
| JP | 2002-60550 A | 2/2002 |
| JP | 2007-63425 A | 3/2007 |
| JP | 2011-38101 A | 2/2011 |
| RU | 2 456 311 C2 | 7/2012 |
| WO | 2012/143336 A1 | 10/2012 |
| WO | 2012/143459 A1 | 10/2012 |
| WO | 2014/054388 A1 | 8/2016 |

OTHER PUBLICATIONS

Fuchs et al., Improvement of the Crosslinking of Polychloroprene, KGK Kautschuk Gummi Kunstaalotte 53, Jahrgang, Nr. 7-8 (2000).*
Fuchs E. et al., "Improvement of the Crosslinking of Polychloroprene," KGK Kautschuk Gummi Kunststoffe 53, No. 7-8 (2000).
Todeschini R, et a., "QSRP Study of Rheological and Mechanical Properties of Chloroprene Rubber Accelerators," Rubber Chemistry and Technology, vol. 87, No. 2, 219-238 (2014).
Extended European Search Report for EP 15202517.7 dated Jun. 23, 2016.
International Search Report for PCT/EP2016/078804 dated Jan. 25, 2017.
Written Opinion of ISA for for PCT/EP2016/078804 dated Jan. 25, 2017.

* cited by examiner

*Primary Examiner* — Robert D Harlan
(74) *Attorney, Agent, or Firm* — Norris McLaughlin, P.A.

(57) ABSTRACT

Essentially ETU-free cross linkable compositions comprising chloroprene rubber, a cross-linker and a vulcanization accelerator, which have a defined content of ions from the second or third main group and resinate anions and thus possesses improved curing characteristics, a process for vulcanization of such compositions and vulcanizates obtained thereby.

16 Claims, No Drawings ns in an amount of more than 2.5% by weight and less than 4.5% by weight based on the total amount of chloroprene rubber.
POLYCHLOROPRENE COMPOSITIONS The invention relates to essentially ETU-free cross linkable compositions based on chloroprene rubber, a process for producing vulcanizates from these compositions, and the vulcanizates obtained thereby.

For the purposes of the present invention, chloroprene rubbers, also referred to as "CR" for short, are copolymers of chloroprene and optionally one or more comonomers, for instance 2,3-dichlorobutadiene, 1-chlorobutadiene, butadiene, isoprene, acrylic acid, methacrylic acid, acrylonitrile, methacrylonitrile, sulfur, acrylate or methacrylate derivatives, diacrylate or dimethacrylate or styrene. The amount of comonomers is generally not more than 25%, preferably not more than 20%, more preferably not more than 15% and most preferably not more than 10% of the total mass of the copolymer.

Chloroprene rubber is known for its unique combination of properties: very good mechanical and dynamical properties, good resistance to ageing and solvents, as well as superior flame resistance.

The production of CR is generally carried out by emulsion polymerization, as described, for instance in Ullmann's Encyclopädie der technischen Chemie, 2004, Rubber, 3. Synthetic, p. 15 et seqq., "Encyclopedia of Polymer Science and Technology", Vol. 3, p. 705-730, John Wiley, New York 1965, P. R. Johnson, Rubber Chem. Technol. 49 (1976) 650-702). By emulsion polymerization of chloroprene (2-chloro-1,3-butadiene), polychloroprene dispersions are produced which are also referred to as polychloroprene latices.

For the production of such latices, the monomers are admixed in an emulsifier system in an aqueous medium. This emulsifier system is generally based on resin acids, in particular resin acids from disproportionated rosin. The temperature range in which the polymerization is performed encompasses values from approx. 0° C. to more than 80° C. Thus, the polymerization can be initiated by thermal free-radical initiators or by redox systems. In general, molecular weight regulators such as mercaptans or xanthogen disulphides are also used. In some cases, the molecular weight of the end product is also adjusted by copolymerization with sulphur and subsequent cleavage of the sulphidic bonds formed. The desired conversion is established by stopping the reaction with a suitable reagent. For obtaining a solid chloroprene rubber, the polychloroprene latices are then either first destabilized by lowering the pH and then coagulated by freeze coagulation e.g. as described in U.S. Pat. No. 2,187,146A or by using salts as described in WO2012/143336 A1 and WO2012/143459 A1.

The addition of 5 phr calcium resinate to polychloroprene is disclosed in U.S. Pat. No. 3,310,564 A in order to improve heat resistance. The polychloroprene used in said publication was obtained according to U.S. Pat. No. 2,567,117 A and contains already more than 1 phr resinate anions from the emulsifier, thus resulting in a total content of resinate anions of more than 5% by weight in the polychloroprene disclosed in U.S. Pat. No. 3,310,564 A.

The vulcanization of chloroprene rubbers is typically carried out using metal oxides such as MgO and ZnO in the presence of vulcanization accelerators. The most efficient vulcanization accelerator is ethylene thiourea (ETU). However, due to its toxicity, ETU has to be replaced by more environmental friendly cure agents. It was found to be difficult to achieve suitable vulcanization rates with less toxic cure agents such as N-methyl-thiazolidine-2-thione (MTT). Moreover, the low scorch safety of chloroprene rubbers containing MTT compound makes its processing difficult (Rubberchem 2006, paper 3 page 4).

It is therefore an object of the present invention to provide cross linkable compositions essentially free of ETU comprising chloroprene rubbers, which have a reduced vulcanization time and allowing an accelerated vulcanizate production process, preferably without compromising the scorch safety. The term essentially free of ETU should in the context of the present invention be understood as containing less than 0.5% by weight, preferably less than 0.1% by weight and most preferably less than 0.01% by weight ETU based on the total amount of chloroprene rubber.

It has surprisingly been found that essentially ETU-free cross linkable compositions comprising chloroprene rubber, a cross-linker and a vulcanization accelerator (different from ETU) exhibit a favorable balance between scorch safety, effective vulcanization time (t90-t10) at high temperature (e.g. 180° C.) and good vulcanizate properties when the chloroprene rubber contains cations of metals from the second or third main group, preferably calcium, magnesium, aluminum or a combination thereof, more preferably calcium, magnesium, or a combination thereof and most preferably calcium in an amount of more than 0.25% by weight and resinate anions in an amount of more than 2.5% by weight and less than 4.5% by weight based on the total amount of chloroprene rubber.

In a preferred embodiment, a metal oxide, preferably a metal oxide selected from zinc oxide and magnesium oxide and mixtures thereof is used as a cross-linker.

Preferably, the vulcanization accelerator is selected from N-methyl-thiazolidine-2-thione (MTT), hexamethylene tetramine and triazine derivatives, more preferably N-methyl-thiazolidine-2-thione. The term resinate anions as used in the context of the present invention shall include all anions of resin acids, in particular anions of abietic acid, dehydroabietic acid, dihydroabietic acid, neoabietic acid, palustric acid, levopimaric acid, pimaric acid or isopimaric acid, as well as their isomers, hydrogenated forms and dehydrogenated forms. The latter three are typically obtained by treatment of rosin with a noble metal catalyst, in particular a Pd-catalyst or with an acid and are often referred to as disproportionated rosin. Preferably the term resinate anions should refer to anions of abietic acid, dehydroabietic acid and dihydroabietic acids.

Preferably, the amount of resinate anions is more than 2.7% by weight and less than 4.5% by weight, more preferably between 2.9% by weight and 3.7% by weight, based on the total amount of chloroprene rubber.

Preferably, the amount of cations of metals from the second and third main group, preferably calcium, magnesium, aluminium or a combination thereof, more preferably calcium, magnesium or a combination thereof and most preferably calcium is from 0.25% by weight to 0.40% by weight.

More preferably the amount of cations of metals from the second and third main group, preferably calcium, magnesium, aluminium or a combination thereof, more preferably calcium, magnesium or a combination thereof and most preferably calcium is from 0.26% by weight to 0.35% by weight, based on the total amount of chloroprene rubber.

Preferably, the amount of resinate anions and the amount of cations of metals from the second and third main group should be understood as the amount of said substances introduced during the production of the polychloroprene latices up to and including the coagulation of the lattices.

The chloroprene rubbers used in the invention can be obtained by emulsion polymerization of chloroprene, wherein the pH of the obtained polychloroprene latex is adjusted to a value above 10.5 and not more than 13.5, preferably between 11.0 to 13.2 and a step where the pH-adjusted latex is coagulated by addition of a salt of a metal of the second or third main group.

The adjustment of pH can be carried out by addition of an organic or inorganic acid, preferably an aqueous acid or carbon dioxide, more preferably by aqueous acetic or hydrochloric acid, and most preferably 20% aqueous acetic acid.

The coagulation can be performed with water soluble polyvalent salts. Suitable salts are of metals from the second or third main group, in particular salts with $Ca^{2+}$, $Mg^{2+}$, $Sr^{2+}$ and/or $Al^{3+}$ cations with for instance sulfate, chloride and/or nitrate anions. Water soluble means a solubility of at least 0.1 g of salt in of 1 liter of water at room temperature. Preferably calcium chloride or magnesium chloride is applied. Preferably, the salts are added in form of an aqueous solution.

By the above process, the lowered pH causes part of the resin acid salts, used as emulsifiers for the polymerization reaction, to be converted into the acid form, whereas a part of said resin acid salts remain as resinate anions. When the water-soluble salts of metals from the second or third main group are added, the remaining resinate anions at least partially form only slightly soluble salts with the cations of the metals from the second or third main group, which remain finely distributed in the coagulated chloroprene rubber.

After the coagulation, the coagulate is usually separated from the liquid phase and subsequently washed and dried by conventional methods as described in the prior art above.

The present invention also relates to a process for the production of vulcanizates wherein an essentially ETU-free cross linkable composition according to the invention is heated to a temperature from 100° C. to 200° C., preferably from 140° C. to 180° C.

The present invention further relates to vulcanizates obtainable from the ETU-free cross linkable composition according to the invention as well as to molded bodies, preferably air springs, conveyor belts, belts, cv boots, bridge bearings, wiper blades or diving suits comprising said vulcanizates.

The present invention further relates to the use of chloroprene rubber containing cations of metals from the second or third main group, preferably calcium, magnesium, aluminium or a combination thereof, more preferably calcium, magnesium, or a combination thereof and most preferably calcium in an amount of more than 0.25% by weight, preferably from 0.25% by weight to 0.40% by weight, most preferably from 0.26% by weight to 0.35% by weight and resinate anions in an amount of more than 2.5% by weight and less than 4.5% by weight, preferably more than 2.7% by weight and less than 4.5% by weight, most preferably between 2.9% by weight and 3.7% by weight based on the total amount of chloroprene rubber for the manufacture of essentially ETU-free cross linkable compositions, vulcanizates obtainable therefrom and molded bodies comprising said vulcanizates.

EXAMPLES

The chloroprene latices used for the following examples were obtained by the following polymerization recipe (batch experiments, quantities given in parts by weight):

| | |
|---|---|
| Chloroprene and 2,3-dichlorobutadiene | 100 |
| Desalinated water | 125 |
| Resin acid | 3 |
| Na-Salt of condensation product consisting of naphthalene sulfonic acid and formaldehyde | 0.5 |
| n-Dodecylmercaptan (n-DDM) | 0.2 |
| KOH | 0.5 |

The polymers obtained from 100 parts by weight technical grade chloroprene were referred to as "homopolymers", whereas the polymers obtained from a monomer mixture comprising 93 parts by weight technical grade chloroprene and 7 parts by weight technical grade 2,3-dichlorobutadiene were referred to as "copolymers".

The technical grade chloroprene may also contain 1-chlorobutadiene, typically in an amount from 0% to 2% by weight.

The polymerization was carried out in a 4 L flask. The aqueous phase made of desalinated water, resin acid, KOH and a Na-Salt of the condensation product of naphthalene sulfonic acid and formaldehyde was placed in this vessel, flushed with nitrogen and heated to a temperature of 45° C. The monomers were added when the medium temperature reached 40° C. Subsequently, the emulsion temperature was stabilized at 45° C. before starting the polymerization. The polymerization was started by constantly adding a solution of thiourea dioxide in water (3% by weight) at flow rate between 0.1 ml/min and 5 ml/min, the latter being adjusted to achieve 70% monomer conversion within 180 min. The conversion rate was determined by gravimetric analysis. The polymerization was stopped with a 0.03% parts by weight, based on the latex, of an aqueous 2.5% by weight solution of diethyl hydroxylamine when the monomer conversion reached 70%. The latex was degassed to a residual chloroprene content below 1000 ppm (based on the latex).

For Reference Examples 1 and 2, the degassed latex pH was adjusted to 7.5 with a 20% by weight aqueous acetic acid solution. The polymer was isolated by freezing coagulation and washed with salt-free water. The sheets obtained were dried to a residual moisture content below 0.6% by weight in a circulating air drying cupboard at 70° C.

For Reference Example 3 the degassed latex was diluted with water to 15% solid content and its pH adjusted to a value of 9 with a 20% aqueous acetic acid. The latex was precipitated with 0.25% calcium chloride in water at room temperature. The coagulate was washed with salt-free water and dried to a residual moisture content below 0.6% by weight in a circulating air drying cupboard at 70° C.

For Examples 1 to 4 according to the invention, the degassed latex was diluted with water to 15% solid content and its pH adjusted to a value between 13 and 11 with a 20% aqueous acetic acid. The latex was precipitated with 0.25% calcium chloride in water at room temperature. The coagulate was washed with salt-free water and dried to a residual moisture content below 0.6% by weight in a circulating air drying cupboard at 70° C.

All rubber compounds were based on the following recipe:

| No. | Component | phr |
|---|---|---|
| 1 | Chloroprene rubber (homo- or copolymer) | 100 |
| 2 | Carbon Black N772 | 30 |
| 3 | Stearic acid | 0.5 |
| 4 | Maglite DE | 4.1 |

-continued

| No. | Component | phr |
|---|---|---|
| 5 | Rhenogran MTT-80 | 0.5 |
| 6 | Zinc Oxide read seal | 5 |

[1] phr: parts per hundred rubber

They were processed in a 1.5 l intermeshing internal mixer according to the following sequence:

| Absolute time [min] | Rotation speed [RPM] | Components added (No.) |
|---|---|---|
| 0 | 44 | 1 |
| 4 | 44 | 2, 3, 4 |
| 6 | 44 | 5, 6 |
| 7 | end | |

Methods

The latex pH was measured with a Schott H 63 glass electrode (Electrolyte: KCl 3 mol/l, Silamid reference system) at 20° C.

In the absence of disturbing substances (e.g. additives) the resinate anion content could be determined by titration of a 2.2% by weight polymer solution in tetrahydrofuran with a 0.1M perchloric acid solution. The titration was monitored by potentiometry (Metrohm Solovotrode Nr 6.0229.100), the volume of perchloric acid added to reach the first potential step ($V_{equivalent}$) was used to calculate the salt amount in the polymer:

$$\text{resinate anion} [\%] = \frac{V_{equivalent} \times 300.5}{\text{mass}_{polymer\ solution} \times 2.2}$$

Where:

$V_{equivalent}$ is expressed in milliliters
$\text{Mass}_{polymer\ solution}$ is expressed in grams
The resulting value is the salt content expressed as a percentage value.

For the ion concentration determination, about 0.2 g rubber sample was digested with mineral acid (5 mL $HNO_3$ (63%), 3 mL $H2O$) in a microwave oven (Mikrowelle Ultraclave III) according to the following temperature program:
  8 min 70° C. 100 bar 700 Watt
  20 min 140° C. 120 bar 700 Watt
  10 min 210° C. 160 bar 1000 Watt
  12 min 250° C. 160 bar 1000 Watt
  18 min 280° C. 160 bar 1000 Watt The prepared sample was then analyzed by ICP-OES (Varian Vista Pro, wavelength 216.956 nm, 407.771 nm and 421.552 nm (reported value is the mean value), 1.2 kW plasma power, 15 l/min plasma gas, 10 s measurement time repeated 3 times, calibration with external standards. In ICP-OES analysis, atoms were excited by inductively coupled plasma. The emitted light of specific wavelength was detected and corresponded to their concentration (in % by weight) in the sample.

The Mooney scorch at 120° C. is determined according to DIN 53 523 Part 4 and MS-t5 as defined in paragraph 2.2 (MS-t5 is the time from the beginning of the measurement up to the point at which the Mooney viscosity increased by 5 Mooney units above the viscosity minimum).

The vulcanization behavior of the compositions was determined in a Monsanto rheometer MDR 2000E at 160° C. and 180° C. in accordance with DIN 53 529. The characteristic vulcanization times tS1, t10 and t90, as well as ΔS' were determined in this way.

In accordance with DIN 53 529, part 3:

t10: time at which 10% of the conversion has been achieved t90: time at which 90% of the conversion has been achieved ΔS': difference between the maximum and the minimum torque The Shore A hardness (H), tensile strength (TS) and the elongation at break (EB) of the vulcanizates were determined by means of a tensile test in accordance with DIN EN ISO 868 and DIN 53504, respectively.

Examples

| | | | resinate | | Scorch | | MDR 45 min@160° C. | | | MDR 45 min@180° C. | | | Mechanical Properties | | |
|---|---|---|---|---|---|---|---|---|---|---|---|---|---|---|---|
| Sample | Composition | pH Latex | anion % | $Ca^{2+}$ % | MS t5 min | ΔS' dNm | t10 min | t90 min | t90 – t10 min | t10 min | t90 min | t90 – t10 min | H Sh A | TS MPa | EB % |
| Ref 1 | Copolymer | 7.5 | 1.07 | <0.01 | 32.1 | 10.1 | 2.9 | 40 | 37.3 | 1.8 | 34.7 | 32.9 | 62 | 19 | 349 |
| Ref 2 | Homopolymer | 7.5 | 1.07 | <0.01 | 26.7 | 12 | 3.4 | 39.9 | 36.5 | 2.7 | 28.7 | 26 | 63 | 20.0 | 348 |
| Ref 3 | Copolymer | 9.0 | 1.84 | 0.21 | 45.0 | 16.5 | 7.0 | 29.2 | 22.2 | 2.6 | 20.2 | 17.6 | 62 | 17.9 | 323 |
| Ref4 | Homopolymer | 7.5 | 1.33 | 0 | 20.6 | 15.6 | 5.3 | 40 | 34.7 | 2.7 | 20.6 | 17.9 | | | |
| Ref 5 | Homopolymer | 7.5 | 4.89 | 0.24 | 15.6 | 11.5 | 3 | 39 | 35.7 | 1.7 | 30.7 | 29.0 | | | |
| Example 1 | Copolymer | 12.8 | 3.02 | 0.26 | 47.9 | 14.4 | 8.1 | 37.3 | 29.2 | 3.1 | 14.8 | 11.7 | 60 | 21.5 | 374 |
| Example 2 | Copolymer | 11.0 | 2.99 | 0.30 | 48.4 | 15.7 | 7.7 | 32.4 | 24.7 | 2.8 | 15.5 | 12.7 | 62 | 19.6 | 341 |
| Example 3 | Homopolymer | 13.1 | 3.51 | 0.29 | >50 | 14.3 | 9.4 | 39.6 | 30.2 | 3.5 | 15.3 | 11.8 | 61 | 21.3 | 371 |
| Example 4 | Homopolymer | 11.0 | 3.21 | 0.27 | 49.1 | 16.1 | 8.2 | 34.9 | 26.7 | 2.9 | 14.4 | 11.5 | 62 | 19.6 | 343 |

Reference Example 4 was obtained according to the method disclosed in U.S. Pat. No. 2,567,117 A and Reference Example 5 was obtained by addition of 4 phr calcium resinate to the polymer of Example 4 in analogy to Example 5 of U.S. Pat. No. 3,310,546 A (although 5 phr of calcium resinate were used in the latter). The results in the table show that when the resinate anions content and the content of cations from the second or third main group is in the range according to the invention, the processing safety (MS t5) is improved significantly and at the same time, the effective vulcanization time (t90-t10) and the vulcanization time (t90) at 180° C. are improved (decreased) as well.

The invention claimed is:
1. A cross-linkable composition comprising:
  a chloroprene rubber comprising:

cations of metals from the second or third main group in an amount of more than 0.25% by weight based on the total amount of chloroprene rubber;

resinate anions in an amount of more than 2.5% by weight and less than 4.5% by weight based on the total amount of chloroprene rubber;

a cross-linker, and a vulcanization accelerator selected from N-methyl-thiazolidine-2-thione derivatives.

2. The cross-linkable composition according to claim 1, wherein the cations of metals from the second or third main group are selected from calcium, magnesium, aluminium or a combination thereof.

3. The cross-linkable composition according to claim 1, wherein the amount of cations of metals from the second or third main group is more than 0.25% by weight to 0.40% by weight.

4. The cross-linkable composition according to claim 1, wherein the amount of resinate anions is more than 2.7% by weight.

5. The cross-linkable composition according to claim 1, wherein the cross-linker is a metal oxide.

6. The cross-linkable composition according to claim 1, wherein the chloroprene rubber is obtained by a process comprising:

adjusting the pH of a polychloroprene latex to a value above 10.5 and not more than 13.5; and coagulating the pH-adjusted latex by addition of a salt of a metal of the second or third main group being a calcium and/or magnesium salt.

7. A process for the production of vulcanisates, the process comprising heating a cross linkable composition according to claim 1 to a temperature 100° C. to 200° C.

8. A vulcanizate obtainable by the process according to claim 7.

9. A molded article of manufacture comprising the vulcanizate according to claim 8.

10. A chloroprene rubber comprising cations of metals from the second or third main group, in an amount of more than 2.5% by weight and less than 4.5% by weight based on the total amount of chloroprene rubber.

11. The chloroprene rubber according to claim 10, wherein the cations of metals comprise calcium, magnesium, aluminum or a combination thereof, the amount of cations is greater than 0.25% by weight to 0.40% by weight, and the amount of resinate anions is more than 2.7% by weight.

12. The chloroprene rubber according to claim 11, wherein the amount of cations is greater than 0.26% by weight to 0.35% by weight, and the amount of resinate anions is between 2.9% by weight and 3.7% by weight.

13. The cross-linkable composition according to claim 1, wherein:

the cations of metals from the second or third main group are selected from the group consisting of calcium, magnesium, aluminium or a combination thereof;

the amount of cations of metals from the second or third main group is 0.26% by weight to 0.35% by weight;

the resinate anions are anions of abietic acid, dehydroabietic acid, dihydroabietic acid, neoabietic acid, palustric acid, levopimaric acid, pimaric acid or isopimaric acid, as well as their isomers, hydrogenated forms and dehydrogenated forms; and the amount of resinate anions is more than 2.7% by weight.

14. The cross-linkable composition according to claim 13, wherein:

resinate anions are anions of abietic acid, dehydroabietic acid and dihydroabietic acids;

the cross-linker is a metal oxide selected from zinc oxide and magnesium ocide and mixtures thereof;

the vulcanization accelerator is selected from N-methyl-thiazolidine-2-thione, N-methyl-thiazolidine-2-thione, hexamethylene tetramine and triazine derivatives; and the chloroprene rubber is obtained by a process comprising:

adjusting the pH of a polychloroprene latex to a value between 11.0 to 13.2; and coagulating the pH adjusted latex by addition of a calcium and/or magnesium salt.

15. The cross-linkable composition according to claim 6, wherein the chloroprene rubber is obtained by a process comprising adjusting the pH of the polychloroprene latex to a value between 11.0 to 13.2 prior to said coagulating.

16. The process according to claim 7, wherein said temperature is from 140° C. to 180° C.

* * * * *